United States Patent [19]

Tamammori

[11] Patent Number: 5,125,722

[45] Date of Patent: Jun. 30, 1992

[54] LOAD COMPENSATION CONTROL VALVE

[75] Inventor: Hideo Tamammori, Kobe, Japan

[73] Assignee: Nippon Air Brake Co., Ltd., Kobe, Japan

[21] Appl. No.: 547,707

[22] Filed: Jul. 3, 1990

[30] Foreign Application Priority Data

Jul. 5, 1989 [JP] Japan ............... 1-79959[U]

[51] Int. Cl.$^5$ ............... B60T 8/22
[52] U.S. Cl. ............... 303/22.5; 303/22.7
[58] Field of Search ............... 303/22.1, 22.6, 22.5, 303/22.7, 22.8, 22.2

[56] References Cited

U.S. PATENT DOCUMENTS

| | | | |
|---|---|---|---|
| 3,692,365 | 9/1972 | Demarez et al. | 303/22.7 |
| 3,945,689 | 3/1976 | Masuda et al. | 303/22.1 |
| 4,077,076 | 3/1978 | Hata | 303/22.1 |
| 4,092,047 | 5/1978 | Amedei et al. | 303/22.1 |
| 4,453,779 | 6/1984 | Bridigum | 303/22.5 |
| 4,586,754 | 5/1986 | Kitagawa | 303/22.5 |
| 4,640,556 | 2/1987 | Fauck et al. | 303/22.1 |

FOREIGN PATENT DOCUMENTS

| | | | |
|---|---|---|---|
| 1780045 | 6/1973 | Fed. Rep. of Germany | 303/22.6 |
| 1284012 | 1/1962 | France | 303/22.5 |

*Primary Examiner*—Matthew C. Graham
*Attorney, Agent, or Firm*—J. B. Sotak

[57] ABSTRACT

A load compensation control valve for an air brake system for railway vehicles having air springs for producing control pressures proportional to the load sustained by the given vehicle. The load compensation control valve includes a supply chamber, an output chamber, a supply vlave, a supply valve seat, an exhaust valve rod, a balance piston, and an adjusting mechanism for controlling the pressure in the output chamber in accordance with the level of the control pressures.

5 Claims, 4 Drawing Sheets

LOAD COMPENSATION CONTROL VALVE

FIELD OF THE INVENTION

This invention relates to a pressure control valve for an air brake system for vehicles which include a load compensation valve, a relay valve, and a pressure adjusting valve, and more particularly, to a vehicular air brake system having a load compensation valve which includes a supply chamber, an output chamber, a supply valve seat, a supply valve, an exhaust valve rod, a balance piston, an intermediate body and an adjusting mechanism for controlling the air pressure conveyed between the supply chamber and the output chamber in proportion to the load sustained by a railway vehicle.

BACKGROUND OF THE INVENTION

The use of load compensation valves in braking systems for railway vehicles has been proposed in past installations. There is shown and disclosed one type of conventional load compensation valve in U.S. Pat. No. 4,586,754, issued on May 6, 1986, and assigned to the same assignee. The structure of the main portion of the load compensation valve is shown in FIG. 5. The load compensation valve 1 includes a supply chamber 2, an output chamber 3, a supply valve 4, an exhaust valve rod 5, and a check valve 30. This load compensation valve 1 may be used to control a brake system as is shown in FIG. 6. In practice, the amount of braking force or power exerted by the brake cylinders is dependent upon the load carried by the given car. As shown, the load compensation valve 1 includes the supply chamber 2 which is connected to an air pressure source MR via a three-way cock KV and also includes the output chamber 3 which is connected to a plurality of electromagnetic valves MV1, MV2 and MV3. A pair of control pressure lines AS1 and AS2 are connected to the lower end of the load compensation valve. The pressure level in each control line AS1 and AS2 is matched to the car load sustained by the air springs on the car. The pressure forces are transferred to the balance piston, which is not shown in FIG. 5, to act on the exhaust valve rod 5. If the control pressures AS1 and AS2 increase, the exhaust valve rod 5 is driven downwardly so that the exhaust valve rod 5 pushes on the supply valve 4 and opens the support port 11. Thus, the valve is placed in the supply position. When the supply pressure is fed into the output chamber 3 and when the pressure increases, the supply valve 4 moves toward its supply valve seat 10. When the air pressure in the output chamber 3 becomes substantially equal to the control pressures AS1 and AS2, the supply valve 4 sits on the seat and assumes a lapped position. In this lapped position, the control pressures AS1 and AS2 will decrease so that the exhaust valve rod 5 is driven in the direction in which it becomes separated from the supply valve 4. Thus, the exhaust valve seat 19 also separates from the supply valve 4. Accordingly, the air pressure in the output chamber 3 is exhausted through the exhaust port 18 to atmosphere. Thus, the air pressure decreases. Now, when the air pressure in the output chamber 3 becomes proportional to the control pressures AS1 and AS2, the exhaust valve rod 5 moves toward the supply valve 4 and results in a decrease in the air pressure in the output chamber 3. Again, the valve goes into the lapped position.

It will be seen that a check valve 30 is provided for causing a different action from the load compensation action. In the case where there is no check valve 30 and no first path 27 and no second path 28, it will be seen that during the time the load compensation valve is operating, the secondary pressure of the control pressure causes the supply chamber 2 to open to the atmosphere via the three-way cock KV. In this state, the supply valve 4 is maintained closed because of the structure of the load compensation valve 1. Thus, the pressure on the output side remains stable. Therefore, the check valve 30 is provided to overcome this condition. For example, in situations where the car has to be moved without a brake command, the brake is manually released so that the brake pressure is released. However, when it is manually released during the operation of the check valve 30, it may be dangerous when the pressure is operating on the output side.

The check valve 30 remains closed even though the supply valve 4 exhausts the supply chamber 2. This is because the check valve 30 is made in such a way that the air pressure from the source MR is operating on the supply valve 4 to balance it completely or almost completely. In order to improve the response, namely, the sensitivity of the check valve 30, it is necessary that it responds to movement of the control pressures AS1 and AS2. In other words, the difference between the effective area A1 of the supply valve seat 10 and the effective area A2 of the sliding part 4c of the supply valve 4 is made to be small so that the force of the air pressure of the source MR that is pushing on the supply valve 4 is small. Conversely, the sensitivity becomes satisfactory since the force required to open the supply valve 4 can also be small. When the air pressure of the source MR is $P_{MR}$, the seating force F of the supply valve 4 can be calculated by the following equation:

$$F = P_{MR}(A1 - A2)$$

Therefore, in this case, the secondary pressure is operated by the control pressure, even though the air pressure in the supply chamber 2 is released by operation of the three-way cock KV. Accordingly, the required force to close the supply valve 4 does not depend on the air pressure of the source MR, so that it does not open.

If a check valve is provided, the pressure in the supply chamber 2 can be discharged by the operation of the three-way cock KV. Thus, the air pressure in the second chamber 24 can decrease so that the required force to open the valve is based on the difference of the air pressures between the first chamber 23 and the second chamber 24. The required force is larger than the force to close the check valve 30. Thus, the check valve 30 separates from the check valve seat 26 so that the passageway 25 is opened, and the air pressure in the output chamber 3 is conveyed through the first path 27, the first chamber 23, passageway 25, the second chamber 24, the second path 28, to the supply chamber 2. Since the air pressure in the output chamber 3 flows in the reverse direction, the air pressure in the output chamber 3 decreases. Accordingly, this action affects the balance piston so that the exhaust valve rod 5 moves in a direction to open the supply valve 4 while it is seated on the supply valve 4, and it opens the supply valve port 11 and this becomes the supply position, so that the secondary side pressure fluid is exhausted, in a reverse direction through the supply valve port 11.

Referring now to FIG. 6, it will be seen that the brake control mechanism BV, the supply train lines SB1, SB2 and SB3, the relay valve RV, the brake cylinder BC, the electromagnetic valves MV1, MV2 and MV3, and the electrical conductors and the pneumatic piping constitute the brake system. The control valve structure is substantially the same as the load compensation valve 1 of FIG. 5. The relay valve RV normally includes the supply chamber C4 and the output chamber C5.

In the above-mentioned load compensation valve 1 of the prior art, a problem occurs when dust settles on the seat surface of the check valve 30 since it cannot block-off the air flow. In addition, if the spring 31 becomes broken or is damaged the check valve 30 will not seat properly so that it cannot block-off the air flow. When the air flow cannot be positively blocked, the load compensation valve 1 will not work properly. In addition, the plate of the check valve 30 has a narrow guideway so that it sometimes becomes cocked during operation. In order to prevent this, the guideway should be enlarged to the size of the supply valve 4. However, this enlargement will result in the whole check valve 30 to become very large. Thus, the previous load compensation valve 1 and the related structural portions will substantially increase when the check valve 30 is incorporated in the load compensation valve so that the reliability of the valve system, as a whole, decreases the entire structure and becomes excessively large, which causes problems.

OBJECTS AND SUMMARY OF THE INVENTION

Accordingly, it is an object of this invention to provide a pressure control valve in which it is possible to discharge the air pressure in the output chamber 3 by opening the supply chamber 2 through the three-way cock KV without the use of an ancillary check valve.

A further object of this invention is to provide a new and improved load compensation control valve which is functionally more stable in operation.

Another object of this invention is to provide a load compensation pressure control valve having a supply chamber, an output chamber, a supply valve seat, an exhaust valve rod, a balance piston, an intermediate body member and an adjusting mechanism for controlling the air brake pressure to a brake cylinder of a railway vehicle.

In accordance with the present invention, there is provided a pressure control valve for an air brake system comprising, a supply chamber connected to the source of pressurized air, an output chamber connected to air pressure utilizing equipment, a supply valve seat protruding into the supply chamber and having a supply port which interconnects the supply chamber with the output chamber, a supply valve which cooperates with the supply valve seat for opening and closing the supply port, an exhaust valve rod having a perforated tip which fits into the supply port and which faces the supply valve, an exhaust passageway open at the perforated tip, a balance piston connected to the exhaust valve rod and receiving air pressure from the output chamber on one side thereof and for receiving an air pressure from a control pressure and a pressure of an adjusting spring on the other side thereof, the balance piston constructed in such a way that the air pressure in the supply chamber which works on the supply valve, the pressure control valve which is characterized by the fact that the supply chamber, the supply port, the supply valve seat, and the supply valve are situated in an intermediate body, the intermediate body is located inside the main body of the pressure control valve in such a way that it can move between a certain range in the direction in which the supply valve opens and closes, and a pilot chamber connected to the supply chamber in such a way that it receives the air pressure from the supply chamber so that it makes the intermediate body move forward toward the exhaust valve rod, and so that it moves backward by the air pressure in the output chamber, and the balance piston is positioned in such a way that the tip of the perforated exhaust valve rod separates the supply valve of the intermediate body in such a way that it touches the supply valve of the intermediate body in the forward position to open the valve.

An additional object of this invention is to provide a unique load compensation valve which is economical in cost, simple in design, durable in operation, efficient in service, and reliable in use.

Many pressure control valves are equipped with the supply chamber which is connected to an air pressure source, and an output chamber which is connected to the air pressure equipment. A supply valve seat extends into the supply chamber and has a supply port which connects the supply chamber and the output chamber. The supply valve either seats on or separates from the supply valve seat to close and open the supply port. An exhaust valve rod is provided with an open tip which fits in the supply port and faces the supply valve. An exhaust passageway opens at the rod tip. A balance piston is connected to the exhaust valve rod and receives the air pressure from output chamber at one side thereof and which receives the pressure based on the control pressure or the adjusting pressure spring on the other side thereof. The air pressure in the supply chamber operates to balance the supply valve. The invention is characterized by the fact that the supply chamber, the supply port, the supply valve seat, and the supply valve are provided in the intermediate body. The intermediate body is located inside the main body of the pressure control valve in a way that it can move over a certain range in the direction in which the supply valve opens and closes. A pilot chamber is connected to the supply chamber and receives the air pressure from the supply chamber. The air pressure makes the intermediate body move forward toward the exhaust valve rod side to exhaust the air pressure. The intermediate body moves backward by the air pressure in the output chamber and the balance piston is positioned at one moving end by the control pressure. The tip of the exhaust valve rod separates from the supply valve of the intermediate body to a retracted position and touches the supply valve of the intermediate body in the forward position to cause the valve to open.

When the supply chamber, which is connected to a source of air pressure, is filled, the pressure in the supply chamber is higher than the pressure in the output chamber. This high pressure air also operates the pilot chamber. Therefore, the intermediate body is normally moved upward. Thus, the pressure control valve opens or closes the supply port or the exhaust port according to the force on the balance piston so that the air pressure in the output chamber is controlled. The operation of the air pressure in the output chamber is the same as that of the existing pressure control valve. When the air pressure in the supply chamber is exhausted, the control valve is controlling the air pressure in the output chamber. Namely, while it is outputting the secondary pressure, the air pressure in the pilot chamber is also exhausted so that the pilot pressure decreases. Thus, the intermediate body is moved downwardly by the air pressure of the output chamber. When the intermediate body moves downwardly, the supply valve also moves downwardly wherein the tip of the exhaust valve rod separates from the supply valve. The exhaust opens the output chamber. Therefore, the air pressure in the output chamber is directly exhausted through the exhaust port.

DESCRIPTION OF THE DRAWINGS

The above objects and other attendant features and advantages will be more readily appreciated as the present invention becomes better understood by reference to the following detailed description when considered in conjunction with the accompanying drawings, wherein:

Referring now to FIGS. 1 and 2, there is shown a first embodiment of a load compensation valve in accordance with the present invention. In this embodiment, the inventive concept is applicable to the load compensation valve which is similar to that of FIGS. 5 and 6. It will be seen that the load compensation valve 41 consists of a supply chamber 42, an output chamber 43, a supply valve seat 44, a supply valve 45, an exhaust valve rod 46, balance piston 47, and other related elements. The main difference in the existing load compensation valve 1 is the fact that there is an intermediate body 48. The body 48 can move upward and downward in accordance with the pressure in the supply chamber 42. As shown, a supply port 49, the supply valve seat 44, and the supply valve 45 are in communication with the intermediate body 48. It will be appreciated that there is no check valve 30 and that there is nothing which is equivalent to a check valve in the existing embodiments of this invention.

Figure 1:
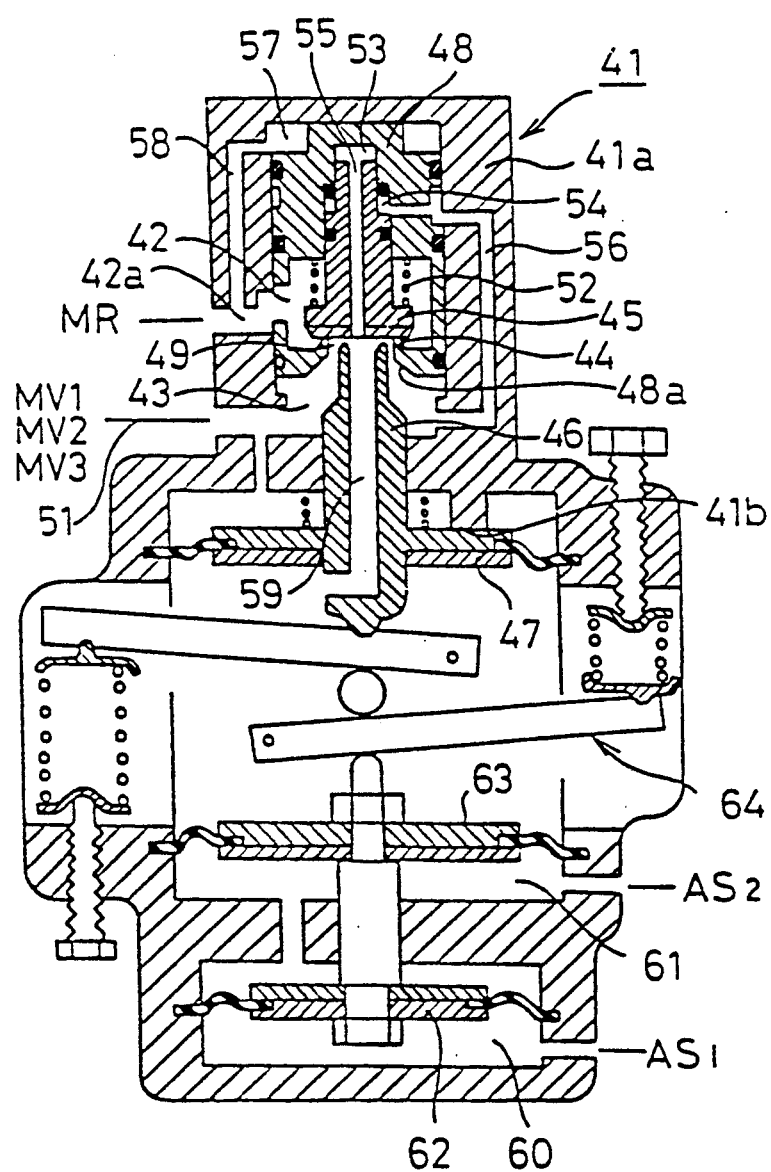
FIG. 1 is a sectional view of a first embodiment of a load compensation valve in accordance with the present invention.

The intermediate body 48 is substantially cylindrical in shape and has an upper end of which is closed. The body 48 is located in the upper portion of the main body 41a in a way that it can move freely up and down over a certain distance. It will be seen that the supply chamber 42 and the supply valve seat 44 are disposed inside and that the supply valve 45 is situated inside of the body. The supply chamber 42 is connected to air pressure source MR by the passageway 42a which is ported at the side walls of the intermediate body 48 and the main body 41a. The output chamber 43 is formed below the intermediate body 48 and is connected to line 51. A supply port 49 is formed in the lower end wall of the intermediate body 48 and is connected to the supply chamber 42 as well as to the output chamber 43. The opening edge of the support port 49 in the output chamber 43 is formed into the supply valve seat 44 which has a circular lip portion which extends into the supply chamber 42. The supply valve seat 44 cooperates with a supply valve 45 which is supported at its rear end and fits inside the central opening in the intermediate body 48. The supply valve 45 is urged downwardly by a biasing spring 52 toward the direction of the seat 44. A first pressure chamber 53 and a second pressure chamber 54 are provided in the back end of the intermediate body 48 of the supply valve 45. The first pressure chamber 53 is connected to the output chamber 43 by a central internal passageway 55 which extends through the supply valve 45. The second pressure chamber 54 is connected to the output chamber 43 by a passageway 56 which is located in the intermediate body 48 and the main body 41a.

A pilot chamber 57 is located between the main body 41a and the rear end of the intermediate body 48. The pilot chamber 57 is connected to the supply chamber 42 via passageway 58 formed in the main body 41a.

The exhaust valve rod 46 extends upward into the output chamber 43 and loosely fits within the supply port 49. As shown, the tip of the exhaust valve rod faces the supply valve 45. The central exhaust passageway 59 is located within the exhaust valve rod and exits at the tip end of the rod. It will be seen that the balance piston 47 is situated at the bottom or rear end of the rod 46. The exhaust valve rod 46 moves up and down with the balance piston 47. The upper position is limited and restricted by stop member 41b. The tip of the rod will not touch the supply valve 45 when the intermediate body 48 is retracted to its upper position as shown in FIG. 1. The structure of the exhaust valve rod 46, the balance piston 47, and/or the other parts below the main body 41a are substantially the same as those of the first existing embodiment and, accordingly, a detailed explanation is not necessary. As shown in FIG. 1, a first control chamber 60 and a second control chamber 61 are located below the piston 47. When a control pressure AS1 and/or when a control pressure AS2 are supplied to the respective ports, the first control piston 62 and the second control piston 63 move upwardly. The upward force on the control pistons due to the control pressure AS1 and/or AS2 is transmitted to the balance piston 47 via the adjusting mechanism 64.

Figure 2:
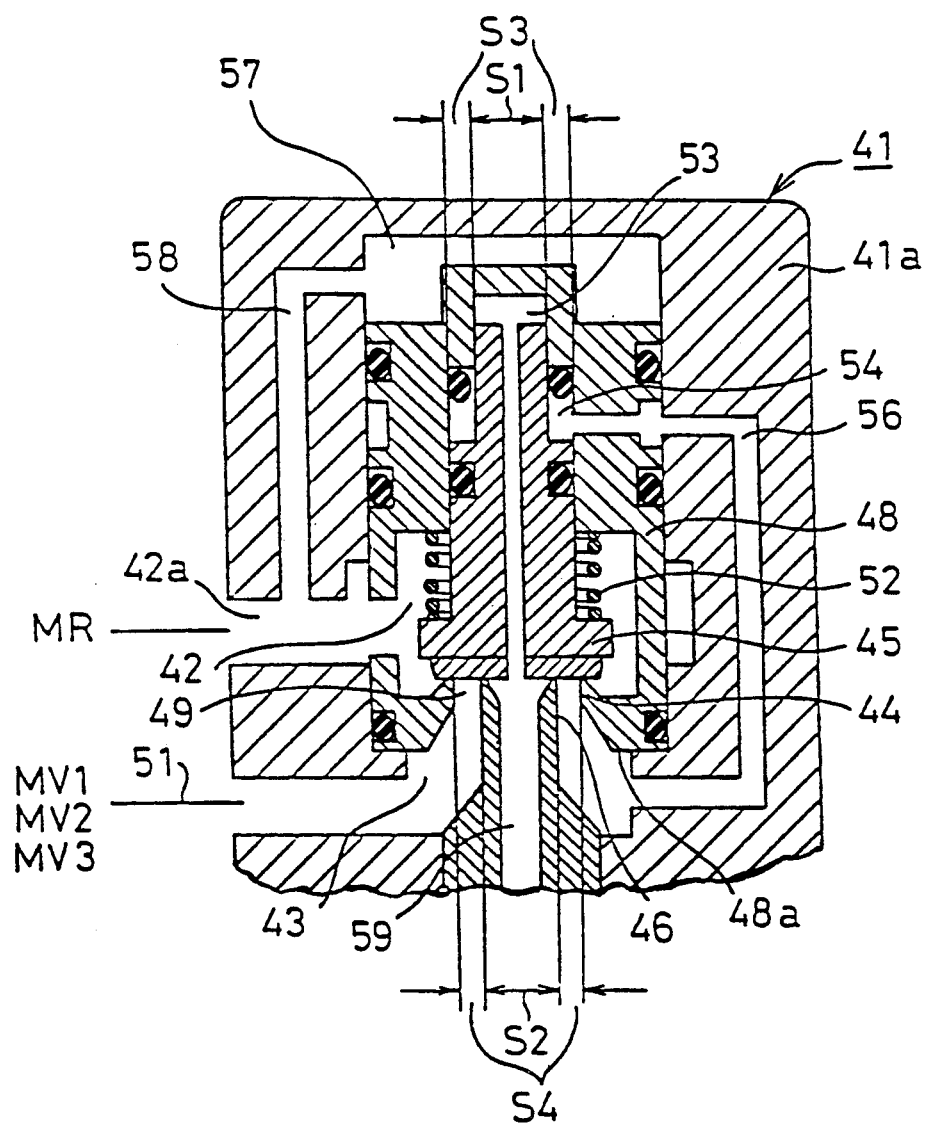
FIG. 2 is the partially enlarged view of the load compensation valve of FIG. 1.

Referring now to FIG. 2, it will be seen that the load compensation valve 41 is in a lapped position in order to approximately balance the force working on the supply valve 45. That is, the effective surface area S1 of the first pressure chamber 53 is made to be equal to the effective surface area S2 of the inside of the exhaust valve seat which surrounds the tip end of the exhaust valve rod 46. In addition, the effective surface area S3 of the second pressure chamber 54 is made to be equal to the surface area S4 which is the area obtained when the effective area of the inside of the exhaust valve seat is subtracted from the effective area of the inside of the supply valve seat 44.

Figure 6:
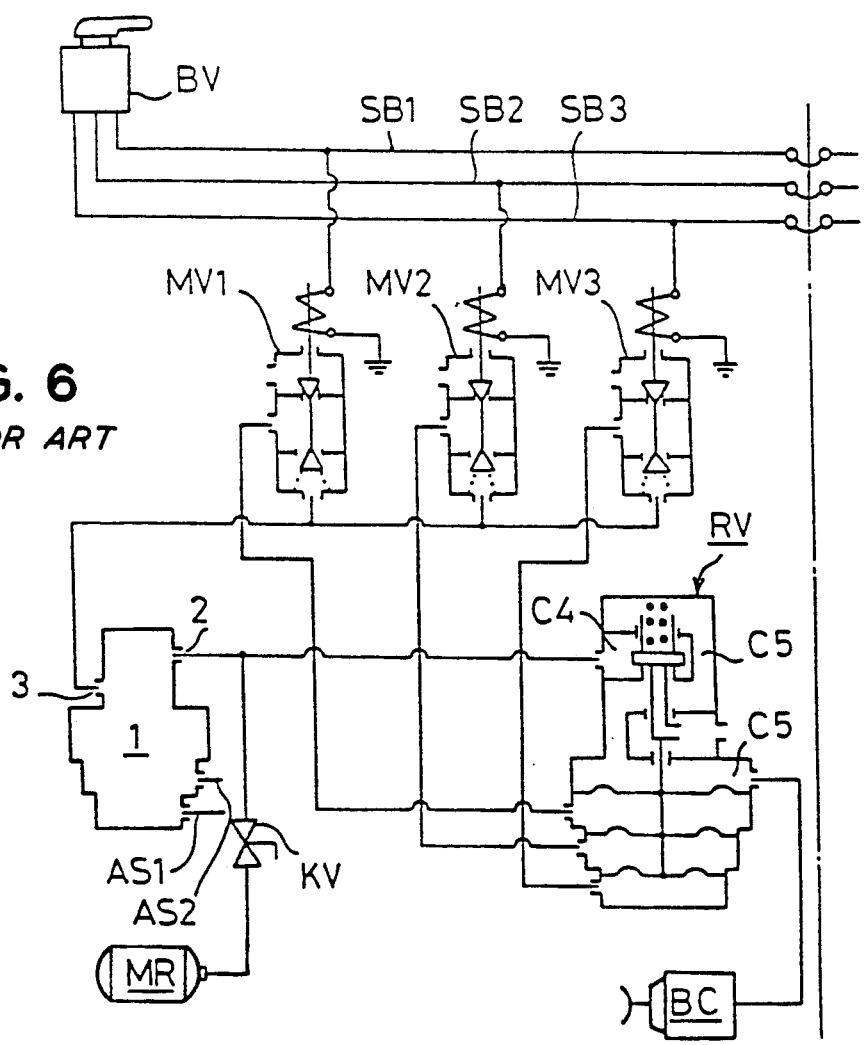
FIG. 6 is a schematic circuit diagram of a system utilizing the load compensation valve shown in FIG. 5.

The load compensation valve 41 is connected to the brake system, as shown in FIG. 6, in the same manner as the prior art valve. When the air pressure is supplied from the source MR to the supply chamber 42, it becomes fully pressurized. At the same time, the pressure in the pilot chamber 57 is fully pressurized so that the intermediate body 48 moves in a downward direction to its lowermost position. When the intermediate body moves downwardly, the pressure of the output chamber 43 is controlled in accordance with the control pressure AS1 and/OR AS2 in the same manner as in previous valves. Under this condition, the pressure of the output chamber 43 becomes matched to the control pressure AS1 and/or AS2, and the exhaust valve seat at the tip end of the exhaust valve rod 46 seats on the supply valve 45, and the supply valve 45 is also sitting on the supply valve seat 44 so that the valve is in the lapped state.

When it is desired to exhaust the air pressure in the output chamber 43, the inside of the supply chamber 42 is exhausted by operating the three-way cock KV, as shown in FIG. 6. Accordingly, the pilot chamber 57 is also exhausted. The intermediate body 48 is shifted upwardly since the pressure in the output chamber 43 is operating on the lower surface 48a. As the intermediate body 48 moves upwardly, the supply valve 45 follows, and the movement of the exhaust valve rod 46 is limited by the upper stop member 41b. As shown in FIG. 1, the tip of the exhaust valve rod 46 separates from the supply valve 45, and the exhaust port 59 opens the output chamber 43, and the air pressure in the output chamber 43 is exhausted through the exhaust port 59.

Figure 3:
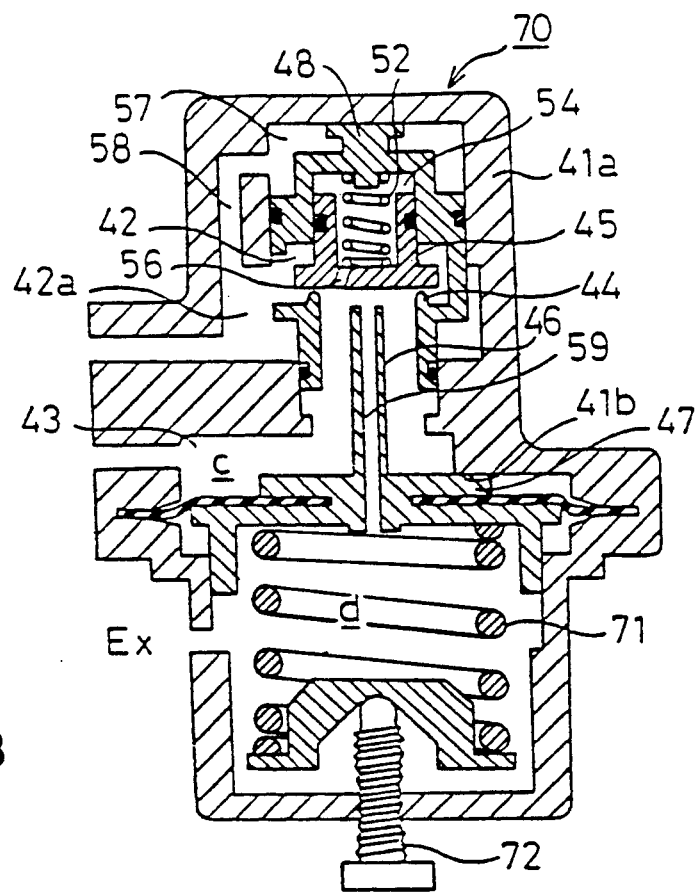
FIG. 3 is a sectional view of a load compensation valve of a second embodiment of the subject invention.

Referring now to FIG. 3, there is shown a second embodiment of the present invention. This pressure load compensation valve is characterized by numeral 70. The point which is different from the first embodiment is the fact that the control pressure can be set by a compressive spring 71 which is adjusted by a threaded screw 72. As shown, in this embodiment there is no first chamber 53 of the supply valve 45 and only a second pressure chamber 54 is provided. The second pressure chamber 54 is effectively connected to the output chamber 43 by a through hole 56 which is located in the supply valve 45. The balance piston 47, the exhaust valve rod 46 and the passageway 59 are substantially the same as those in the first embodiment so that they are marked the same, and no detailed explanation is believed necessary. It will be understood that the effective surface area of the second pressure chamber 54 and the effective surface area of the inside of the supply valve seat 44 are made to be almost equal in this pressure load compensation valve.

In this pressure load compensation valve 70, the supply chamber 42 is exhausted while it is in the lapped position and the intermediate body 48 moves upwardly and assumes the position indicated in FIG. 3 so that the inside of the output chamber 43 can also be exhausted.

Figure 4:
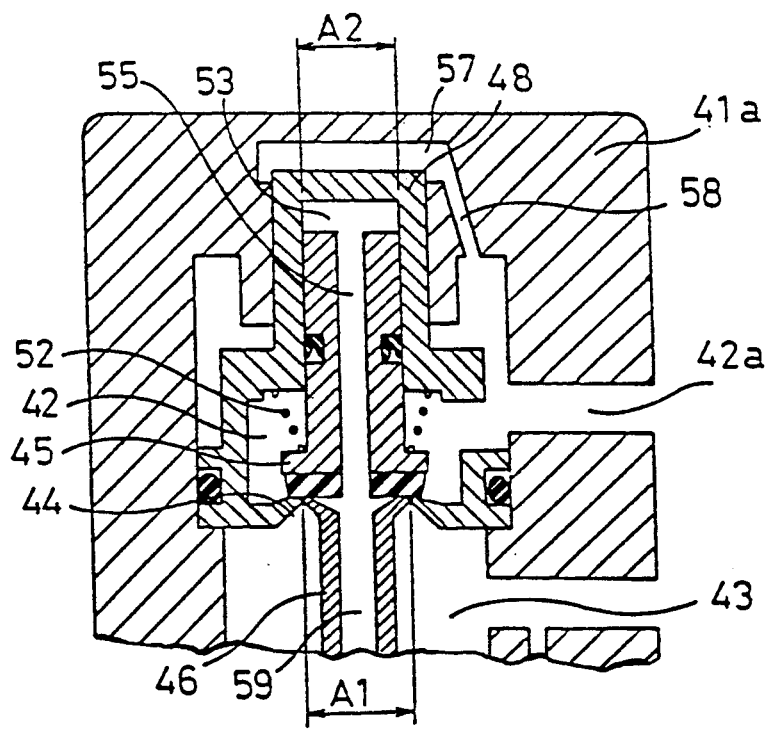
FIG. 4 is a partial enlarged sectional view of a load compensation valve of a third embodiment of the present invention.

Referring now to FIG. 4, there is shown a third embodiment of the present invention. In this embodiment, the location of the intermediate body 48 is modified. It will be seen that the second pressure chamber 54 of the first embodiment has been omitted and only the first pressure chamber 53 is provided in this third embodiment. In this arrangement, the intermediate body 48 moves upwardly. The structure is similar to that of FIG. 5, but there is no check valve 30. The difference between the effective surface area A1 of the supply valve seat 44 and the effective surface area A2 of the first back pressure chamber 53 is made to be very small. The elements which are the same as in the first embodiment are marked with the same reference characters.

In this embodiment, the valve is shown in lapped condition so that the inside of the supply chamber 42 is exhausted. The intermediate body 48 moves upwardly and the tip of the exhaust valve rod 46 separates from the supply valve 45 so that the inside of the output chamber 43 is exhausted.

Figure 5:
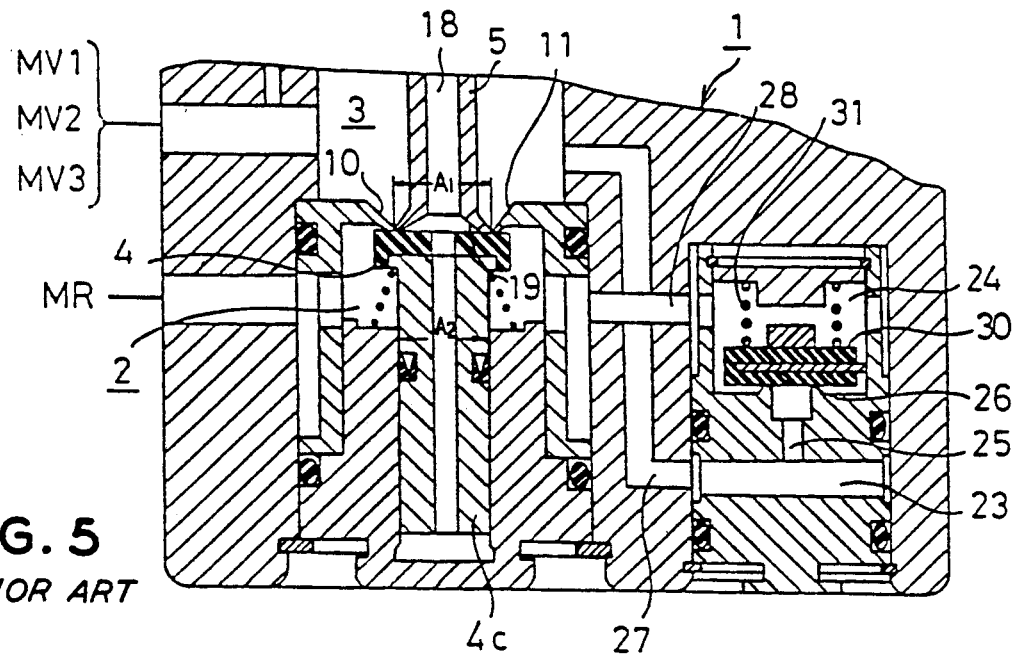
FIG. 5 is a partial sectional view of the essential parts of a different conventional load compensation valve.

It will be seen that in this invention, the supply chamber, the supply port, the supply valve seat and the supply valve of the pressure control valve of the existing load compensation valve are situated in the intermediate body, and it is constructed in such a way that the intermediate body moves back from the pressure controlling position by the normal load compensation action. That is, it assumes a position in which the exhaust port opens by the air pressure in the output chamber when the air pressure of the supply chamber is exhausted, so that the air pressure in the output chamber can be exhausted with the air pressure in the supply chamber without a check valve that was necessary in the previous existing load compensating valve. Therefore, it is possible to eliminate at least one cause of the failure since there is no check valve, and the reliability of the overall valve device is markedly improved. In addition, the cost advantage is also improved since any member equivalent to the intermediate body was constructed in a fixed manner, as shown in FIG. 5, and if this is made in a movable manner, the pilot chamber and the passageway can be conveniently added so that a troublesome check valve can be eliminated.

Thus, the present invention has been described in such full, clear, concise and exact terms as to enable any person skilled in the art to which it pertains to make and use the same, and having set forth the best mode contemplated of carrying out this invention. I state that the subject matter, which we regard as being my invention, is particularly pointed out and distinctly asserted in what is claimed. It will be understood that variations, modifications, equivalents and substitutions for components of the above specifically described embodiment of the invention may be made by those skilled in the art without departing from the spirit and scope of the invention as set forth in the appended claims.

I claim:

1. A pressure control valve for an air brake system comprising, a supply chamber connected to a source of pressurized air, an output chamber connected to air pressure utilizing equipment, a supply valve seat protruding into the supply chamber and having a supply port which interconnects the supply chamber and having a supply port which interconnects the supply chamber with the output chamber, a supply valve which cooperates with the supply valve seat for opening and closing the supply port, an exhaust valve rod having a perforated tip which fits into the supply port and which faces the supply valve, an exhaust passageway opens at the perforated tip, a balance piston connected to the exhaust valve rod and receiving air pressure from the output chamber on one side thereof and for receiving an air pressure from a control pressure and a pressure of an adjusting spring on the other side thereof, the balance piston permits the air pressure in the supply chamber to work on the supply valve, the pressure control valve is so configured that the supply chamber, the supply port, the supply valve seat, and the supply valve are situated in an intermediate body, the intermediate body is located inside the main body of the pressure control valve and is movable between a certain range in the direction in which the supply valve opens and closes, and a pilot chamber is connected to the supply chamber so that it receives the air pressure from the supply chamber so that it moves the intermediate body forward toward the exhaust valve rod, and so that the intermediate body is moved backward away from the exhaust valve rod by the air pressure in the output chamber, and the balanced piston is so positioned that the perforated tip of the exhaust valve rod separates the supply valve of the intermediate body so that it touches the supply valve of the intermediate body in the forward position to open the valve.

2. The pressure control valve, as defined in claim 1, an adjusting mechanism provides an upward force on the balance piston.

3. The pressure control valve, as defined in claim 2, the adjusting mechanism includes a first and a second control piston.

4. The pressure control valve, as defined in claim 3, wherein the first control piston is controlled by air pressure in a first control chamber.

5. The pressure control valve, as defined in claim 3, wherein the second control piston is controlled by air pressure in a second control chamber.

* * * * *